United States Patent [19]

Reinhard et al.

[11] 3,909,357

[45] Sept. 30, 1975

[54] PROCESS FOR THE CONVERSION OF A-SERIES INTO C-SERIES DIGITALIS GLYCOSIDES

[75] Inventors: Ernst Reinhard, Tubingen-Kressbach; Hans-Martin Boy, Onstmettingen; Kurt Stach, Mannheim-Waldhof; Fritz Kaiser, Lampertheim; Hans Joachim Lubs, Weinheim, all of Germany

[73] Assignee: Boehringer Mannheim G.m.b.H., Mannheim-Waldhof, Germany

[22] Filed: Aug. 27, 1974

[21] Appl. No.: 501,010

[30] Foreign Application Priority Data
Aug. 29, 1973 Germany.............................. 2343400

[52] U.S. Cl............................. 195/51 R; 260/210.5

[51] Int. Cl.²........................................... C12B 1/00
[58] Field of Search................................... 195/51 R

[56] References Cited
OTHER PUBLICATIONS
Chemical Abstracts, Vol. 73, 42410w; 1970.

Primary Examiner—Lionel M. Shapiro
Assistant Examiner—Robert J. Warden
Attorney, Agent, or Firm—Burgess, Dinklage & Sprung

[57] ABSTRACT

Digitalis glycosides of the A-series are 12β-hydroxylated by incubating a submersion culture of callus tissue of *Digitalis lanata* with an A-glycoside and isolating the C-series glycosides obtained.

16 Claims, No Drawings

PROCESS FOR THE CONVERSION OF A-SERIES INTO C-SERIES DIGITALIS GLYCOSIDES

The present invention is concerned with a process for the conversion of Digitalis glycosides of the A-series into the corresponding glycosides of the C-series. More specifically, the invention relates to the suspension culturing of *Digitalis lanata* callus tissues to effect such conversion.

The compounds in question are represented by the following formula:

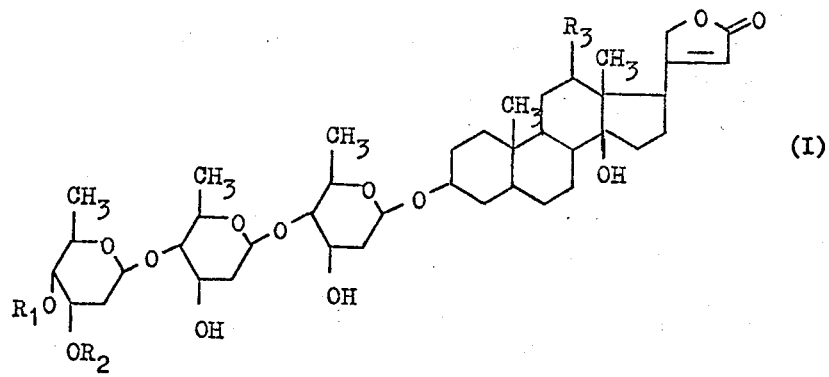

wherein $R_1$, $R_2$ and $R_3$ are defined in the following Table I:

TABLE I

| A-glycosides; $R_3 = H$ | $R_1$ | $R_2$ | C-glycosides; $R_3 = OH$ |
|---|---|---|---|
| digitoxin | H | H | digoxin |
| β-acetyldigitoxin | CH₃CO | H | β-acetyldigoxin |
| α-acetyldigitoxin | H | CH₃CO | α-acetyldigoxin |
| β-methyldigitoxin | CH₃ | H | β-methyldigoxin |
| α-methyldigitoxin | H | CH₃ | α-methyldigoxin |
| Purpurea glycoside-A | glucose | H | desacetyl-lanatoside C |
| lanatoside-A | glucose | CH₃CO | lanatoside-C |

It is known that cultures of undifferentiated cells of Digitalis are not capable of the production of cardenolides (see J. M. H. Graves, W. K. Smith, Nature, 214, 1248/1967; E. Teuscher, Pharmazie, 28, 6/1973; H. Pilgrim, Phytochemistry, 11, 1725/1972; T. Furuya et al., Phytochemistry, 12, 1626/1973). The reason for this has been recognized as being the absence of certain enzyme systems which intervene at certain points in the biosynthesis of cardenolides. Thus, in Digitalis callus cultures, there is missing, for example, the "cholesterol side chain cleaving enzyme" which, in the normal plants, is responsible for the breakdown of cholesterol to the cardenolide precursor pregnenolone.

Furthermore, the enzyme constitution of the callus cultures differs from that of the normal plants at the place responsible for the biotransformation of progesterone into 5β-H-pregnan-3β-ol-20-one. In this case, callus cultures from 5α-H-pregnan-3β-ol-20-one. Therefore, it has also not been possible to stimulate the tissue culture, by the addition of cardenolide precursors cholesterol or progesterone, for the production of cardenolides. Furthermore, it is known that callus cultures of *Digitalis purpurea* can convert added digitoxin into Purpurea glycoside-A, Purpurea glycoside-B and gitoxin. In other words, a glucosidizing and 16β-hydroxylation of digitoxin to glycosides of the B-series takes place (see T. Furuya et al., Chem. Pharm. Bull., 18, 1080/1970).

This conversion of digitoxin to gitoxin is not only of scientific interest but could also be of some practical value because this glycoside, in the form of acyl derivatives, is used therapeutically.

However, of far greater interest is the hydroxylation of A-glycosides into 12β-position to give C-glycosides, for example the formation of digoxin from digitoxin.

We have now found, surprisingly, that this 12β-hydroxylation takes place when submersed callus cultures of *Digitalis lanata* are incubated with added A-glycosides (digitoxin, α- or β-acetyldigitoxin, lanatoside-A, Purpurea glycoside-A or α- or β-methyldigitoxin.

Accordingly, the invention comprises incubating a submersed culture of callus tissue of *Digitalis lanata* with A-glycoside to effect 12-β hydroxylation of Digitalis A-glycosides, and recovering the C-glycosides so obtained.

The hydroxylation preferentially takes place at the "genuine glycoside" stage (to lanatoside-C or desacetyl-lanatoside-C), which means that added digitoxin, α-acetyldigitoxin or α-methyldigitoxin is first glucosidated in the 4-position of the terminal digitoxose and subsequently 12β-hydroxylated. In the course of the experimental period, especially in the presence of light, there occur all the enzyme actions known from the final stages of the glycoside biosynthesis, i.e. glucosidation, splitting off of glucose, acetylation, deacetylation and 12β-hydroxylation, as is shown in the following reaction scheme:

Reaction scheme for the conversion of digitoxin into lanata-C-glycosides

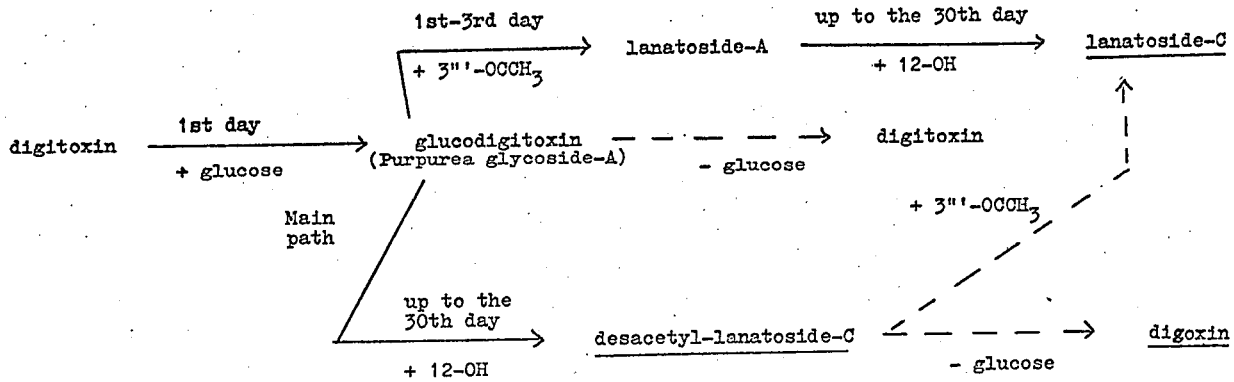

However, once the 12β-hydroxyl group has been introduced, it is not split off again to any appreciable extent until the optimum yield of C-glycosides has been achieved.

Of especial importance is the 12β-hydroxylation of β-methyldigitoxin to β-methyldigoxin. It takes place, but with a somewhat lower yield, although, as a result of blocking of the 4-hydroxyl group in the terminal digitoxose by the methyl radical, glucosidation is not possible and although both "methyldigitoxosides" are, as partially synthetic conversions, "unnatural" for Digitalis cells.

The conversion of the A-glycosides mainly takes place in the callus cells which, in the course of time, give up the reaction products more and more to the nutrient solution.

For carrying out the process according to the present invention, tissue cultures are prepared in known manner (see H. Koblitz, Zell- und Gewebezuechtung bei Pflanzen, pub. G. Fischer Verlag, Stuttgart, 1972), by applying stem parts of sprouting Digitalis lanata plants or other parts of one or two year old plants or also of sterile cultured seed plants under sterile conditions to suitable nutrient media (e.g. in tilted agar-agar tube cultures), followed by incubation in light of varying intensity or in the dark at temperatures of 20° to 25°C. and preferably of about 24°C. After 3 to 4 weeks, but in some cases after 6 weeks, scar tissues form on the plant parts in the form of undifferentiated cell masses which are separated from the original plant parts under sterile conditions and applied to an appropriate nutrient medium in vessels of suitable size, for example 300 ml. Erlenmeyer flasks. After 4 to 8 weeks, the cell conglomerates which have formed during this time are separated off and the parts again transferred to fresh nutrient medium.

The cultures can be grown on most of the nutrient media used for tissue culturing and preferably upon those described by Nitsch (cf. H. Koblitz, loc. cit.). Growth promoting agents can also be added to the nutrient medium, for example, 5 mg./liter of 2,4-dichlorophenoxy-acetic acid.

For carrying out the hydroxylation, the cell conglomerates are introduced into a suspension culture. Depending upon the size of the intended reaction batch, culturing is carried out in vessels of different size; in the case of comparatively small batches, Erlenmeyer flasks can be used, whereas in the case of comparatively large batches, fermentation vessels can be employed (see E. Reinhard, Deutsche Apotheker Zeitung, 107, 1201/1967) which are suitable for the continuous culturing of tissue suspensions. The incubation can be carried out in light of varying intensity or in the dark at temperatures between 18° and 38°C. and preferably at temperatures between 20° and 25°C. The aeration necessary for optimum growth of the suspension culture can be provided for either by shaking the vessel or by blowing in air.

The A-glycoside to be converted is dissolved in an appropriate, readily volatile organic solvent which is diluted with water, for example in an aqueous alcohol, and after sterilization by filtration, added to the suspension culture.

The experimental period is usually between 7 and 30 days. Thereafter, the tissue and nutrient solution are worked up separately or together, either directly or after a pretreatment, for example concentration and lyophilization, according to known methods, by extraction with organic solvents and the glycosides present in the extracts separated directly or after the action of weak bases for splitting off the acetyl radicals and after splitting off the glucose with a β-glucosidase, whereby there is obtained the readily separable two-component mixture of digitoxin and digoxin, by multiplicative partitioning or by adsportion chromatography and the desired C-glycosides then crystallized.

The course of the reaction and the point of optimum yield of C-glycosides can be monitored by qualitative and quantitative thin layer chromatography of sample extracts of the tissue and nutrient medium from the individual experimental batches, which samples can be withdrawn every 1 to 4 days.

For this purpose, there are best used TLC-finished plates of silica gel, eluent I = water-saturated methyl ethyl ketone, eluent II = xylene-methyl ethyl ketone (2:3) + 5 percent formamide on plates impregnated with formamide. The quantitative glycoside measurement can be carried out fluorometrically, directly on the thin layer chromatography plates, for example in the manner described in Planta Medica, 21, 5/1972.

The following Examples are given for the purpose of illustrating the present invention:

EXAMPLE 1

12β-Hydroxylation of digitoxin (experiment in light)

As nutrient medium, there is used a solution which, per liter, had the following composition: 950 mg. potassium nitrate, 720 mg. ammonium nitrate, 185 mg. magnesium sulfate heptahydrate, 166 mg. calcium chloride, 68 mg. potassium dihydrogen phosphate, 25 mg. manganese sulfate tetrahydrate, 10 mg. boric acid, 10 mg. zinc sulfate heptahydrate, 0.25 mg. sodium molybdate dihydrate, 0.025 mg. copper sulfate pentahydrate, 5 ml. of a solution of 7.45 g. of the disodium salt of ethylenediamine-tetraacetic acid and 5.57 g. ferrous sulfate heptahydrate per liter, 100 mg. myoinositol, 2 mg. glycine, 5 mg. nicotinic acid, 0.5 mg. pyridoxine hydrochloride, 0.5 mg. thiamine hydrochloride, 0.5 mg. folic acid, 0.05 mg. biotin, 20 g. saccharose and 300 ml. coconut milk.

Into 40 × 300 ml. Erlenmeyer flasks were placed suspension cultures of pre-cultured cell conglomerates of *Digitalis lanata* callus tissue in 50 ml. amounts of nutrient medium, whereafter 2 mg. digitoxin dissolved in 1 ml. 40 percent ethanol were introduced into each flask. Subsequent incubation was carried out in the light on a shaking machine rotating at 60 to 70 r.p.m. The oxygen tension was thereby about 5 mMol $O_2$ per hour and per liter. The incubation temperature was 24°C. and the period of incubation was 25 days.

Thereafter, the contents of the 40 flasks were separated by filtration into tissue and nutrient medium. The tissue was lyophilized directly and the nutrient solution was first concentrated in a rotary evaporator at 50°C. and then lyophilized. The dry residue from the tissue weighed 90 g. and that from the nutrient solution 18 g.

The dry residues were separately extracted for 20 minutes by refluxing with 80 percent methanol and the extracts were mixed with 30 percent ammonium sulfate solution and defatted with petroleum ether. The methanolic phases were mixed with water and shaken out five times, each time with one half of their volume of chloroform.

The evaporated, dry residues amounted to: tissue extract (TE) 2.5 g. and the nutrient solution extract (NSE) 0.4 g. Samples were taken for the TLC-direct fluorometric glycoside determination. The composition in TE + NSE, expressed as percentages of the total glycosides, was as follows:

| *Purpurea*glycoside-A | 28.2 |
| lanatoside-A | 2.8 |
| digitoxin | trace |
|---|---|
| A-glycosides | 31.0 |
| desacetyl-lanatoside-C | 50.0 |
| lanatoside-C | 18.5 |
| digoxin | 0.5 |
|---|---|
| C-glycosides | 69.0 |

For the isolation of the C-glycosides as digoxin, TE and NSE were together worked up as follows:

2.9 g. extract were left to stand for 3 days at ambient temperature in a mixture of 25 ml. 70 percent methanol and 6 ml. triethylamine and subsequently evaporated to dryness in a rotary evaporator. After the addition of 250 ml. water and 500 mg. strophanthobiase, the mixture was left to stand for 6 days at ambient temperature, then mixed with 50 g. ammonium sulfate, shaken out four times with 80 ml. chloroform and the combined chloroform extracts then evaporated to dryness, 2.2 g. of material thereby being obtained. After multiplicative partitioning in the phase mixture chloroform-carbon tetrachloride-methanol-water (1:1:1:1) via 4 stages, the aqueous phase was extracted with chloroform, the extract was evaporated and the residue was crystallized from chloroform-methanol-diisopropyl ether to give 42 mg. digoxin.

EXAMPLE 2

12β-Hydroxylation of lanatoside-A (experiment in light)

The experimental procedure and the culture conditions were the same as those described in Example 1.

The reaction was monitored by TLC direct fluorometry on samples taken every 1 to 4 days. The optimum content of C-glycosides was achieved after 22 days. There preponderated the hydroxylation of lanatoside-A to lanatoside-C which, after the sixth day, proceeded strongly. From the tenth day onward, smallish amounts of desacetyl-lanatoside-C were also formed. During the whole of the experimental period, Purpurea glycoside-A was found in almost constant amount and could even be detected on the first day. The composition of the glycosides on the 22nd day, as percentage of the total, was as follows:

| *Purpurea* glycoside-A | 10 |
| lanatoside-A | 51 |
|---|---|
| A-glycosides | 61 |
| desacetyl-lanatoside-C | 7 |
| lanatoside-C | 32 |
|---|---|
| C-glycosides | 39 |

EXAMPLE 3

12β-Hydroxylation of lanatoside-A (experiment in the dark)

The experimental conditions were the same as those used in Example 1, except that the cultures were kept in the dark.

An optimum content of C-glycosides was obtained 25 days after commencement of the incubation period. 90 percent of the glycosides were then present as lanatoside-C, the remaining 10 percent being unreacted lanatoside-A. Desacetyl-lanatoside-C was only formed in traces. After only 6 days 31 percent and after 12 days 60 percent of the lanatoside-C was formed. Purpurea glycoside-A was not formed.

EXAMPLE 4

12β-Hydroxylation of β-methyldigitoxin (experiment in light)

The culture conditions were the same as those described in Example 1. The optimum was reached only 7 days after commencement of the incubation. The glycoside mixture was then composed of 60 percent β-methyl-digitoxin and 40 percent β-methyldigoxin. Further conversion products were not formed. The main amount of both glycosides was present in the tissues during the whole of the experimental period.

EXAMPLE 5

12β-Hydroxylation of α-acetyldigitoxin

The experimental conditions were the same as those described in Example 1 except that a cell conglomerate, precultured in the dark, was, in the suspension culture, illuminated for the first 2 days after the addition of α-acetyldigitoxin and then further incubated in the dark until the end of the experiment. Optimum conversion was reached after 25 days. On the 25th day, the composition of the glycosides, expressed as a percentage of the total, was as follows:

| | |
|---|---|
| *Purpurea* glycoside A | 9 |
| lanatoside A | 15 |
| A-glycosides | 24 |
| desacetyl-lanatoside-C | 20 |
| lanatoside-C | 56 |
| C-glycosides | 76 |

EXAMPLE 6

12β-Hydroxylation of β-methyldigitoxin (experiment in the dark)

The experimental conditions were the same as those described in Example 4 except that the tissue suspension culture pre-cultured in the darkness was, after the addition of β-methyldigitoxin, incubated in the dark for the whole of the course of the experiment. Even after 7 days, the optimum conversion was reached. 70 percent of the added material was converted into β-methyldigoxin, 80 percent of which was present in the nutrient solution.

It will be appreciated that the instant specification and examples are set forth by way of illustration and not limitation, and that various modifications and changes may be made without departing from the spirit and scope of the present invention.

What is claimed is:

1. Process for the 12β-hydroxylation of Digitalis glycosides of the A-series, which process comprises incubating a submersion culture of callus tissue of *Digitalis lanata* with an A-glycoside, and isolating the C-series glycosides obtained.

2. Process as claimed in claim 1 wherein the Digitalis glycoside used is digitoxin.

3. Process as claimed in claim 1 wherein the Digitalis glycoside used is α- or β-acetyl-digitoxin.

4. Process as claimed in claim 1 wherein the Digitalis glycoside used is lanatoside-A.

5. Process as claimed in claim 1 wherein the Digitalis glycoside used is Purpurea glycoside-A.

6. Process as claimed in claim 5 wherein incubation is carried out at a temperature between 20° and 25°C.

7. Process as claimed in claim 1 wherein the Digitalis glycoside used is α- or β-methyl-digitoxin.

8. Process as claimed in claim 1 wherein said incubation is carried out in light.

9. Process as claimed in claim 1 wherein said incubation is carried out in the dark.

10. Process as claimed in claim 1 wherein said incubation is carried out at a temperature between 18° and 38°C.

11. Process as claimed in claim 1 wherein the incubation period is 7 to 30 days.

12. Process as claimed in claim 1 wherein said incubation is carried out in a suspension culture.

13. Process as claimed in claim 12 wherein the organic solvent extract is treated with a weak base to split off acetyl radicals.

14. Process as claimed in claim 12 wherein the organic solvent extract is treated with a β-glucosidase to split off glucose.

15. Process as claimed in claim 1 wherein the A-glycoside to be converted is dissolved in a readily volatile, organic solvent diluted with water and added to the submersion culture.

16. Process as claimed in claim 1 wherein the C-glycosides are isolated by at least one of (a) extraction with organic solvents, (b) multiplicative partitioning and (c) adsorption chromatography.

* * * * *